(12) United States Patent
Richardson et al.

(10) Patent No.: US 8,464,059 B2
(45) Date of Patent: Jun. 11, 2013

(54) SYSTEM AND METHOD FOR DEVICE BOUND PUBLIC KEY INFRASTRUCTURE

(75) Inventors: Ric B. Richardson, Irvine, CA (US);
Craig S. Etchegoyen, Irvine, CA (US);
Dono Harjanto, Irvine, CA (US);
Bradley C. Davis, Irvine, CA (US)

(73) Assignee: NetAuthority, Inc., San Francisco, CA (US)

( * ) Notice: Subject to any disclaimer, the term of this patent is extended or adjusted under 35 U.S.C. 154(b) by 1048 days.

(21) Appl. No.: 12/329,419

(22) Filed: Dec. 5, 2008

(65) Prior Publication Data
US 2009/0150674 A1 Jun. 11, 2009

Related U.S. Application Data

(60) Provisional application No. 60/992,704, filed on Dec. 5, 2007, provisional application No. 61/055,129, filed on May 21, 2008.

(51) Int. Cl.
*H04L 9/00* (2006.01)

(52) U.S. Cl.
USPC ........... 713/171; 713/151; 713/167; 713/170; 726/26; 726/29

(58) Field of Classification Search
USPC ........................................ 713/171
See application file for complete search history.

(56) References Cited

U.S. PATENT DOCUMENTS

| | | | |
|---|---|---|---|
| 4,351,982 A | 9/1982 | Miller et al. | |
| 4,658,093 A | 4/1987 | Hellman | |
| 4,704,610 A | 11/1987 | Smith et al. | |
| 4,796,220 A | 1/1989 | Wolfe | |
| 5,210,795 A | 5/1993 | Lipner et al. | |
| 5,291,598 A | 3/1994 | Grundy | |
| 5,414,269 A | 5/1995 | Takahashi | |
| 5,418,854 A | 5/1995 | Kaufman et al. | |
| 5,440,635 A | 8/1995 | Bellovin et al. | |
| 5,490,216 A | 2/1996 | Richardson, III | |
| 5,666,415 A | 9/1997 | Kaufman | |
| 5,745,879 A | 4/1998 | Wyman | |

(Continued)

FOREIGN PATENT DOCUMENTS

| AU | 678985 | 6/1997 |
|---|---|---|
| EP | 1 637 958 | 3/2006 |

(Continued)

OTHER PUBLICATIONS

"Canon User Manual—Nikon Coolpix S52/S52c," Apr. 21, 2008, entire manual.

(Continued)

*Primary Examiner* — Kambiz Zand
*Assistant Examiner* — Yonas Bayou
(74) *Attorney, Agent, or Firm* — Sean D. Burdick (57) ABSTRACT

Techniques are provided secured communication of data, such as in the context of a public key infrastructure (PKI). In one embodiment, the technique may involve using a private key that is bound to the device requesting the secure data, thereby making it harder for someone to copy, steal or fake. The private key may be generated by adding a filler code to a unique device identifier. The identifier may be based on at least one user-configurable parameter and at least one non-user-configurable parameter of the device.

21 Claims, 11 Drawing Sheets

U.S. PATENT DOCUMENTS

| | | | |
|---|---|---|---|
| 5,754,763 A | 5/1998 | Bereiter | |
| 5,790,664 A | 8/1998 | Coley et al. | |
| 5,925,127 A | 7/1999 | Ahmad | |
| 5,974,150 A | 10/1999 | Kaish et al. | |
| 5,991,402 A * | 11/1999 | Jia et al. | 705/59 |
| 6,009,401 A | 12/1999 | Horstmann | |
| 6,044,471 A | 3/2000 | Colvin | |
| 6,158,005 A * | 12/2000 | Bharathan et al. | 726/29 |
| 6,230,199 B1 | 5/2001 | Revashetti et al. | |
| 6,233,567 B1 | 5/2001 | Cohen | |
| 6,243,468 B1 | 6/2001 | Pearce et al. | |
| 6,243,469 B1 | 6/2001 | Kataoka et al. | |
| 6,243,811 B1 * | 6/2001 | Patel | 713/167 |
| 6,294,793 B1 | 9/2001 | Brunfeld et al. | |
| 6,330,670 B1 | 12/2001 | England et al. | |
| 6,343,361 B1 * | 1/2002 | Nendell et al. | 713/171 |
| 6,449,645 B1 | 9/2002 | Nash | |
| 6,536,005 B1 | 3/2003 | Augarten | |
| 6,785,825 B2 | 8/2004 | Colvin | |
| 6,804,257 B1 | 10/2004 | Benayoun et al. | |
| 6,859,793 B1 | 2/2005 | Lambiase | |
| 6,920,567 B1 | 7/2005 | Doherty et al. | |
| 6,940,422 B1 | 9/2005 | Bachelder et al. | |
| 6,976,009 B2 | 12/2005 | Tadayon et al. | |
| 7,032,110 B1 | 4/2006 | Su et al. | |
| 7,069,440 B2 | 6/2006 | Aull | |
| 7,069,595 B2 | 6/2006 | Cognigni et al. | |
| 7,085,741 B2 | 8/2006 | Lao et al. | |
| 7,107,462 B2 | 9/2006 | Fransdonk | |
| 7,117,526 B1 | 10/2006 | Short | |
| 7,188,241 B2 | 3/2007 | Cronce et al. | |
| 7,203,966 B2 | 4/2007 | Abburi et al. | |
| 7,206,765 B2 | 4/2007 | Gilliam et al. | |
| 7,213,149 B2 * | 5/2007 | Mache | 713/170 |
| 7,272,728 B2 | 9/2007 | Pierson et al. | |
| 7,310,813 B2 | 12/2007 | Lin et al. | |
| 7,319,987 B1 | 1/2008 | Hoffman et al. | |
| 7,327,280 B2 | 2/2008 | Bachelder et al. | |
| 7,337,147 B2 | 2/2008 | Chen et al. | |
| 7,343,297 B2 | 3/2008 | Bergler et al. | |
| 7,463,945 B2 | 12/2008 | Kiesel et al. | |
| 7,653,899 B1 | 1/2010 | Lindahl et al. | |
| 7,698,416 B2 | 4/2010 | Potti et al. | |
| 7,716,482 B2 * | 5/2010 | Jung et al. | 713/171 |
| 7,739,401 B2 | 6/2010 | Goyal | |
| 7,908,662 B2 * | 3/2011 | Richardson | 726/26 |
| 2001/0034712 A1 | 10/2001 | Colvin | |
| 2001/0044782 A1 | 11/2001 | Hughes et al. | |
| 2002/0019814 A1 | 2/2002 | Ganesan | |
| 2002/0082997 A1 | 6/2002 | Kobata et al. | |
| 2002/0161718 A1 | 10/2002 | Coley et al. | |
| 2003/0033541 A1 | 2/2003 | Edmark et al. | |
| 2003/0065918 A1 | 4/2003 | Willey | |
| 2003/0172035 A1 | 9/2003 | Cronce et al. | |
| 2003/0204726 A1 * | 10/2003 | Kefford et al. | 713/171 |
| 2003/0217263 A1 * | 11/2003 | Sakai | 713/154 |
| 2004/0024860 A1 | 2/2004 | Sato et al. | |
| 2004/0030912 A1 | 2/2004 | Merkle et al. | |
| 2004/0059929 A1 | 3/2004 | Rodgers et al. | |
| 2004/0143746 A1 | 7/2004 | Ligeti et al. | |
| 2004/0172558 A1 | 9/2004 | Callahan et al. | |
| 2004/0187018 A1 | 9/2004 | Owen et al. | |
| 2004/0196162 A1 | 10/2004 | Brooke | |
| 2004/0215661 A1 | 10/2004 | Zhang et al. | |
| 2005/0010786 A1 * | 1/2005 | Michener et al. | 713/185 |
| 2005/0050531 A1 | 3/2005 | Lee | |
| 2005/0097204 A1 | 5/2005 | Horowitz et al. | |
| 2005/0108173 A1 | 5/2005 | Stefik et al. | |
| 2005/0138155 A1 | 6/2005 | Lewis | |
| 2005/0172280 A1 | 8/2005 | Ziegler et al. | |
| 2005/0264431 A1 | 12/2005 | Bachelder | |
| 2006/0026442 A1 | 2/2006 | Ittogi | |
| 2006/0072444 A1 | 4/2006 | Engel et al. | |
| 2006/0095454 A1 * | 5/2006 | Shankar et al. | 707/101 |
| 2006/0130135 A1 | 6/2006 | Krstulich et al. | |
| 2006/0161914 A1 | 7/2006 | Morrison et al. | |
| 2006/0230317 A1 | 10/2006 | Anderson | |
| 2006/0233361 A1 | 10/2006 | Hasegawa et al. | |
| 2006/0265337 A1 | 11/2006 | Wesinger, Jr. | |
| 2006/0265758 A1 | 11/2006 | Khandelwai et al. | |
| 2006/0282511 A1 | 12/2006 | Takano et al. | |
| 2007/0136726 A1 | 6/2007 | Freeland et al. | |
| 2007/0168288 A1 | 7/2007 | Bozeman | |
| 2007/0198422 A1 | 8/2007 | Prahlad et al. | |
| 2007/0203846 A1 | 8/2007 | Kavuri et al. | |
| 2007/0219917 A1 | 9/2007 | Liu et al. | |
| 2007/0253549 A1 | 11/2007 | Celikkan et al. | |
| 2007/0255947 A1 | 11/2007 | Choudhury et al. | |
| 2007/0282615 A1 | 12/2007 | Hamilton et al. | |
| 2008/0065552 A1 | 3/2008 | Elazar et al. | |
| 2008/0074289 A1 | 3/2008 | Sauder et al. | |
| 2008/0082813 A1 * | 4/2008 | Chow et al. | 713/2 |
| 2008/0086423 A1 | 4/2008 | Waites | |
| 2008/0147556 A1 | 6/2008 | Smith et al. | |
| 2008/0183622 A1 | 7/2008 | Dixon et al. | |
| 2008/0228578 A1 | 9/2008 | Mashinsky | |
| 2008/0320607 A1 | 12/2008 | Richardson | |
| 2009/0051568 A1 | 2/2009 | Corry et al. | |
| 2009/0083730 A1 | 3/2009 | Richardson | |
| 2009/0138975 A1 | 5/2009 | Richardson | |

FOREIGN PATENT DOCUMENTS

| | | |
|---|---|---|
| EP | 1 637 961 | 3/2006 |
| EP | 1 670 188 A2 | 6/2006 |
| EP | 1 912 413 | 4/2008 |
| WO | 9220022 | 11/1992 |
| WO | 9301550 | 1/1993 |
| WO | 9535533 | 12/1995 |
| WO | 9535533 A1 | 12/1995 |
| WO | WO 9535533 A1 * | 12/1995 |
| WO | 0067095 | 11/2000 |
| WO | WO 2004/086672 | 10/2004 |
| WO | WO 2005/094544 | 10/2005 |
| WO | 2005/104686 A2 | 11/2005 |
| WO | WO 2006/138393 | 12/2006 |
| WO | 2007/060516 A2 | 5/2007 |
| WO | WO 2007/022134 | 7/2007 |
| WO | WO 2008/013504 | 1/2008 |
| WO | WO 2008/118074 | 10/2008 |
| WO | 2008157639 | 12/2008 |
| WO | 2009039504 | 3/2009 |
| WO | 2009065135 | 5/2009 |

OTHER PUBLICATIONS

Jensen et al., "Assigning and Enforcing Security Policies on Handheld Devices," 2002, 8 pages.

International Search Report and Written Opinion for corresponding International Application No. PCT/US2008/085730 dated May 18, 2009, total 15 pages.

Wikipedia: "Software Extension," May 28, 2009, Internet Article retrieved on Oct. 11, 2010. XP002604710.

Williams, R., "A Painless Guide to CRC Error Detection Algorithms," Aug. 13, 1993, 33 pages, www.ross.net/crc/download/crc_v3.txt.

Williams et al., "Web Database Applications with PHP & MySQL," *O'Reilly Media Chapter 1. Database Applications and the Web* Mar. 2002, Internet Article retrieved on Sep. 21, 2010. XP002603488.

Angha et al.; Securing Transportation Network Infrastructure with Patented Technology of Device Locking—Developed by Uniloc USA; http://www.dksassociates.com/admin/paperfile/ITS%20World%20Paper%20Submission_Uniloc%20_2_.pdf; Oct. 24, 2006.

Econolite; Econolite and Uniloc Partner to Bring Unmatched Infrastructure Security to Advanced Traffic Control Networks with Launch of StrongPoint; http://www.econolite.com/docs/press/20080304_Econolite_StrongPoint.pdf; Mar. 4, 2008.

* cited by examiner

SYSTEM AND METHOD FOR DEVICE BOUND PUBLIC KEY INFRASTRUCTURE

CROSS-REFERENCE TO RELATED APPLICATION(S)

This application claims priority pursuant to 35 U.S.C. §119 (e) to U.S. Provisional Application No. 60/992,704, entitled "SYSTEM FOR DEVICE BOUND PUBLIC KEY INFRASTRUCTURE," filed Dec. 5, 2007, and to U.S. Provisional Application No. 61/055,129, entitled "DEVICE AND METHOD FOR SECURED COMMUNICATION," filed May 21, 2008, both of which are specifically incorporated herein, in their entirety, by reference.

BACKGROUND OF THE INVENTION

1. Field of the Invention

The present application relates generally to managing software use, and more specifically to systems and methods to enable the monitoring and adjusting software usage under a software license.

2. Description of the Related Art

Public key infrastructure (PKI) encryption is used to secure data exchanges in digital form. It comprises a unique mathematical property that allows part of the PKI encryption subsystem to be public and part of the subsystem to remain secret, but in the process negates the need for a secret to be shared between two parties wishing to share protected data. This has been a major breakthrough in secure data exchange.

Figure 1:
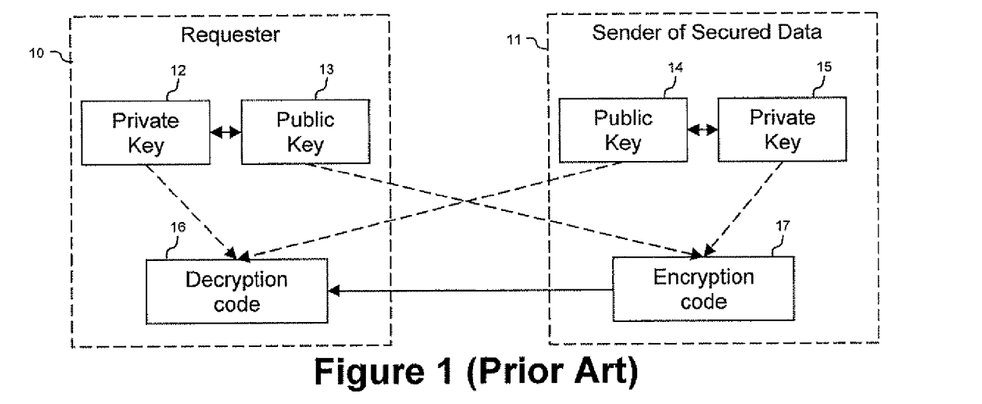
FIG. 1 shows a known public key infrastructure (PKI).

FIG. 1 represents a simple public key infrastructure encryption system as commonly used in the art. It is included for informational purposes. This encryption system comprises two sets of two keys, one each for the sender and recipient of the encrypted data. The key pairs on each side of the data exchange consist of a private key 12, 15 that is kept secret by the user and a public key 13, 14 which is shared with the other party in the exchange of data. There is a unique relationship between the private key 14 and the public key 15 of the sender 11 and the private key 12 and the public key 13 of the receiver 10 that allows the sender 11 of data to use their private key 15 and the recipient's public key 13 to produce an encryption code 17 that is used to encrypt the data. Conversely, the simple public key infrastructure encryption system allows the requester 10 to use the sender's public key 14 and their own private key 12 to produce a decryption code 16 that can in turn be used to decrypt the data after receipt.

However, a major problem or shortcoming with such existing systems is that the secret part of the PKI subsystem, also called the private key, can be copied, stolen or faked. Accordingly, there is a need for an improved technique for securing communication via PKI encryption that prevents the copying or stealing of private keys, the use of fake private keys, etc.

SUMMARY OF THE INVENTION

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

The present invention addresses the above-described shortcomings of existing encryption systems by using a private key that is bound to the device requesting the secure data, thereby making it harder for someone to copy, steal or fake. The present invention also adds a layer of authentication to the data exchange in that the unique device ID or identifier can also be used for forensic purposes in proving who has received or sent particular protected data.

In accordance with one or more aspects of the present invention, there are provided techniques that involve: (a) generating a requester key pair for a data requesting device, the pair comprising a requester private key and a requester public key; (b) receiving a unique device identifier from the device; (c) calculating a difference between the identifier and the requester private key; and (d) storing the difference as a filler code.

In related aspects, the techniques may also involve: (e) in response to a request for data from the device, identifying the device; (f) encrypting the data using a sender private key and the requester public key; and (g) sending the encrypted data and the filler code to the device. In further related aspects, Step (g) may further involve publishing a sender public key, such that the device is able to (i) compute the requester private key by adding the filler code to the identifier and (ii) use the computed requester private key to decrypt the encrypted data.

In accordance with one or more aspects of the present invention, there are provided techniques that involve: (a) receiving from a data sender a request for a unique device identifier of a requesting device; (b) in response to the request from the sender, compiling unique identifying information from a computing environment of the device; (c) generating the identifier based at least in part on the compiled information; and (d) providing the generated identifier to the sender.

In related aspects, the techniques may also involve: (e) receiving encrypted data and a filler code from the sender; (f) computing a requester private key by adding the filler code to the identifier; and (g) using the computed requester private key to decrypt the encrypted data. In further related aspects, step (b) may further involve compiling at least one user-configurable parameter and at least one non-user-configurable parameter of the device.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) can be practiced without these specific details. In other instances, well-known structures and devices are shown in block diagram form in order to facilitate describing one or more embodiments.

Figure 2:
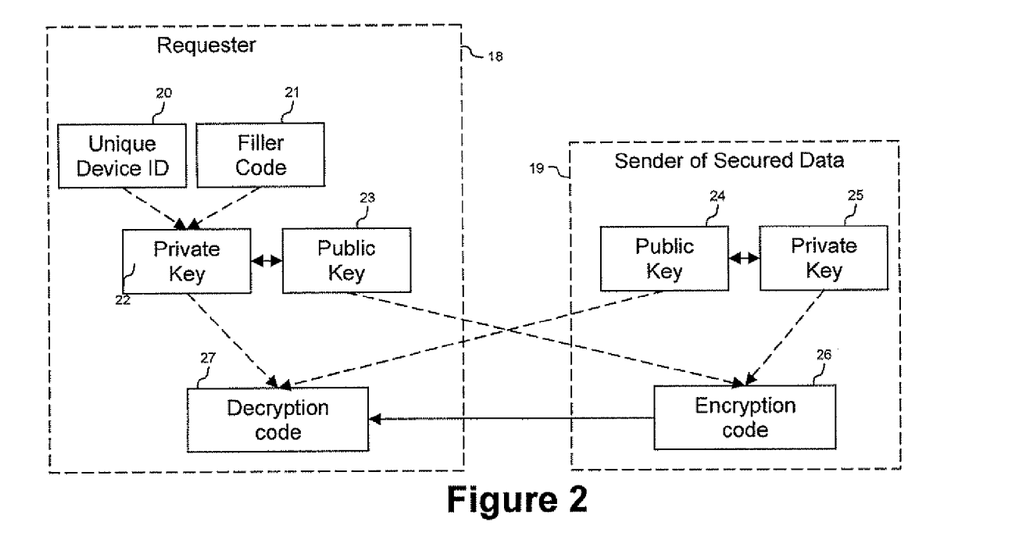
FIG. 2 illustrates an embodiment of a device bound PKI system.

In accordance with one or more aspects of the embodiments described herein, there is provided a system and method for sending data via secured communication in a public key infrastructure. FIG. 2 shows an example embodiment of how to bind the simple public key infrastructure of figure one to a specific computing device. The encryption system operates implements certain features of a simple public key infrastructure encryption system; however the requester's private key 22 is not stored locally but generated by producing a unique device ID 20 (also referred to herein as a unique device identifier) from the operating environment of the local computing device and combining it with a filler code 21 that together produce a comparable private key 22 that can, in turn, be used for decryption 27 of PKI encrypted data. The unique device ID is usually a string of data resulting from the compiling of unique identifying information from the devices computing environment. Examples of this are hard drive serial number and data storage damage locations in a computing device. Further examples of unique identifying information that be used to generate/compute the unique device ID are provided below.

Figure 3:
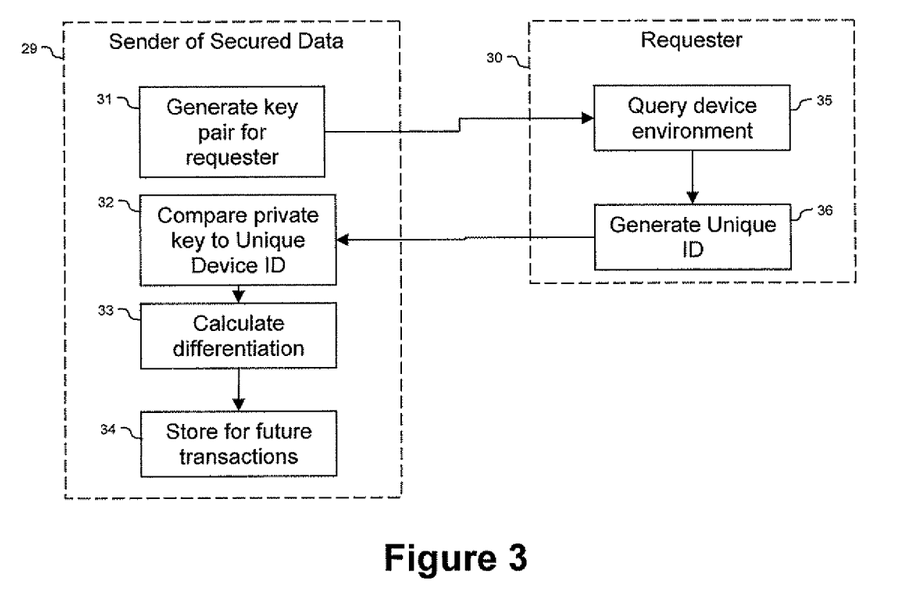
FIG. 3 provides a flow diagram for an exemplary approach to device bound private key generation.

FIG. 3 shows an exemplary way in which a recipient's private key can be generated by a sender. Initially a key pair may be generated (step 31) using standard PKI key generation known in the art. The two keys may then be set aside for use as a public key and a private key. The sender 29 may then request the requester 30 to send back to them a unique device ID 35 generated from the operating environment of the recipient's device. The sender 29 then compares the unique device ID with the private key 32 to be used by the requester 30 (step 32). The sender 29 may calculate the difference between the unique device ID and the private key 33 (step 33). This calculated difference may be stored as a filler code (step 34).

Figure 4:
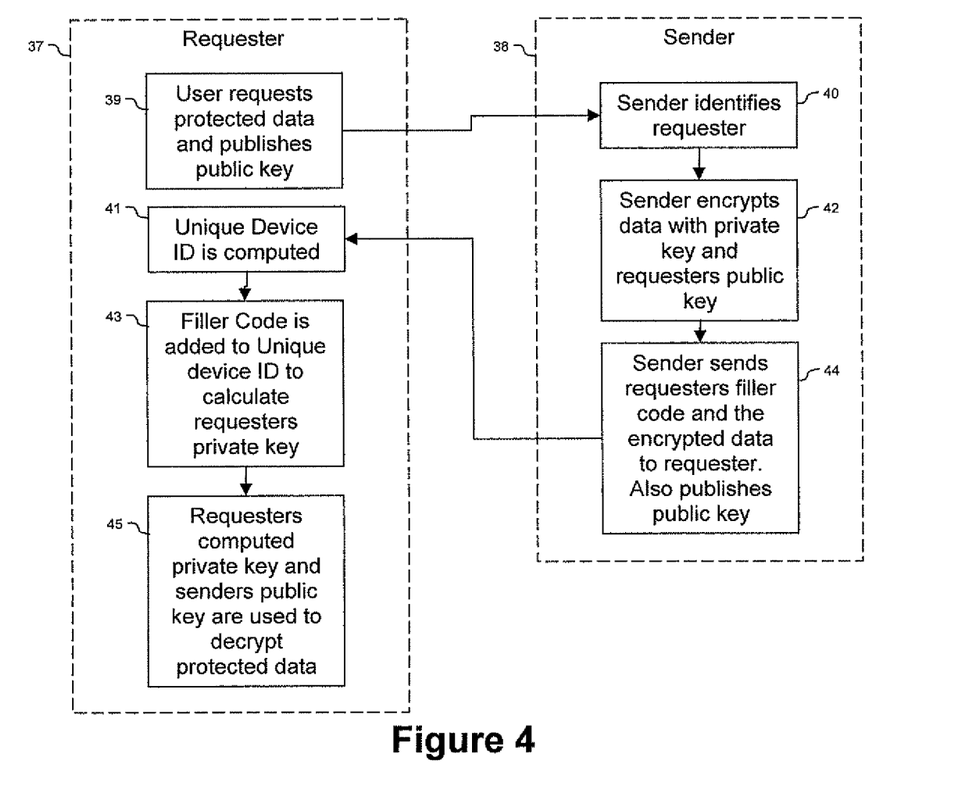
FIG. 4 provides a flow diagram for an exemplary approach to device bound private key use.

FIG. 4 illustrates an exemplary manner in which a device bound private key may be used in practice. The requester 37 asks for encrypted data to be sent to them and also publishes their public key 39 to be used as part of the data exchange (step 39). The sender 38 identifies the requester 37 (step 40), and encrypts the data 42 to be sent using their own private key 25 and the requester's public key 23 (step 42). Then (at step 44) the sender 38 sends to the requester 37 the encrypted data, the requester's filler code 21 that has been previously generated, and publishes their own public key 24.

The requester then generates or computes unique device ID 20 (step 41), and computes its own private key 22 by adding the filler code 21 to the computed ID (step 43). This computed value is then used to decrypt 27 the data for use (step 45).

In another embodiment, the above described techniques for generating the device bound private key, as described with reference to FIG. 3, and techniques for using the device bound private key, as described with reference to FIG. 4, may be applied to or used with public key cryptography (PKC) and authentication, where there is no key pair on both sides of the data exchange. Additionally, device binding may be used to generate public as well as private keys allowing for an additional layer of security and authentication.

In yet another embodiment, the technique for generating and using keys may involve the generation and subsequent storage for use later of the unique device ID without the need to generate a unique device ID every time data is exchanged.

In related aspects, the device identity (i.e., the unique device identifier) may comprise and/or be generated from unique device identifying information, wherein the unique device identifying information may comprise at least one user-configurable parameter and/or at least one non-user-configurable parameter of the given device. The device identity may be generated by utilizing at least one irreversible transformation of the at least one user-configurable and the at least one non-user-configurable parameters of the given device. The device identity may be generated by utilizing a cryptographic hash function on the at least one user-configurable and the at least one non-user-configurable parameters of the given device.

It is noted that generating the device identity may also be described as generating a device fingerprint and may entail the sampling of physical, non-user configurable properties as well as a variety of additional parameters such as uniquely generated hashes and time sensitive values. Physical device parameters available for sampling may include, for example, unique manufacturer characteristics, carbon and silicone degradation and small device failures.

The process of measuring carbon and silicone degradation may be accomplished by measuring a chip's ability to process complex mathematical computations, and its ability to respond to intensive time variable computations. These processes measure how fast electricity travels through the carbon. Using variable offsets to compensate for factors such as heat and additional stresses placed on a chip during the sampling process allows for each and every benchmark to reproduce the expected values. During a standard operating lifetime, the process of passing electricity through the various switches causes a computer chip to degrade. These degradations manifest as gradually slower speeds that extend the processing time required to compute various benchmarking algorithms.

In addition to the chip benchmarking and degradation measurements, the process for generating a device identity may include measuring physical, non-user-configurable characteristics of disk drives and solid state memory devices. Each data storage device has a large variety of damage and unusable data sectors that are nearly unique to each physical unit. The ability to measure and compare values for damaged sectors and data storage failures provides a method for identifying storage devices.

Device parameter sampling, damage measurement and chip benchmarking make up just a part of device fingerprinting technologies described herein. These tools may be further extended by the use of complex encryption algorithms to convolute the device identity values during transmission and comparisons. Such encryption processes may be used in conjunction with random sampling and key generations.

The device identity may be generated by utilizing machine or device parameters associated with one or more of the following: machine model; machine or hard drive serial number; machine copyright; machine ROM version; machine bus speed; machine details; machine manufacturer; machine ROM release date; machine ROM size; machine UUID; and machine service tag.

The device identity may also be generated by utilizing machine parameters associated with one or more of the following: CPU ID; CPU model; CPU details; CPU actual speed; CPU family; CPU manufacturer; CPU voltage; and CPU external clock.

The device identity may also be generated by utilizing machine parameters associated with one or more of the following: memory model; memory slots; memory total; and memory details.

The device identity may also be generated by utilizing machine parameters associated with one or more of the following: video model; video details; display model; display details; audio model; and audio details.

The device identity may also be generated by utilizing machine parameters associated with one or more of the following: network model; network address; Bluetooth address; Blackbox model (including IDE and SCSI); Blackbox serial; Blackbox details; Blackbox damage map; Blackbox volume name; NetStore details; and NetStore volume name.

The device identity may also be generated by utilizing machine parameters associated with one or more of the following: optical model; optical serial; optical details; keyboard model; keyboard details; mouse model; mouse details; printer details; and scanner details.

The device identity may also be generated by utilizing machine parameters associated with one or more of the following: baseboard manufacturer; baseboard product name; baseboard version; baseboard serial number; and baseboard asset tag.

The device identity may also be generated by utilizing machine parameters associated with one or more of the following: chassis manufacturer; chassis type; chassis version; and chassis serial number.

The device identity may also be generated by utilizing machine parameters associated with one or more of the following: IDE controller; SATA controller; RAID controller; and SCSI controller.

The device identity may also be generated by utilizing machine parameters associated with one or more of the following: port connector designator; port connector type; port connector port type; and system slot type.

The device identity may also be generated by utilizing machine parameters associated with one or more of the following: cache level; cache size; cache max size; cache SRAM type; and cache error correction type.

The device identity may also be generated by utilizing machine parameters associated with one or more of the following: fan; PCMCIA; modem; portable battery; tape drive; USB controller; and USB hub.

The device identity may also be generated by utilizing machine parameters associated with one or more of the following: device model; device model IMEI; device model IMSI; and device model LCD.

The device identity may also be generated by utilizing machine parameters associated with one or more of the following: wireless 802.11; webcam; game controller; silicone serial; and PCI controller.

In accordance with one or more aspects of the embodiments described herein, there is provided a device for sending data via secured communication in a public key infrastructure. With reference to the embodiment of FIG. 5A, there is provided a device 100 may include a communication module 110 for communicating with a data requesting device; at least one processor 120 in operative communication with the communication module 110; and a memory 130 in operative communication with the at least one processor 120.

Figure 5A:
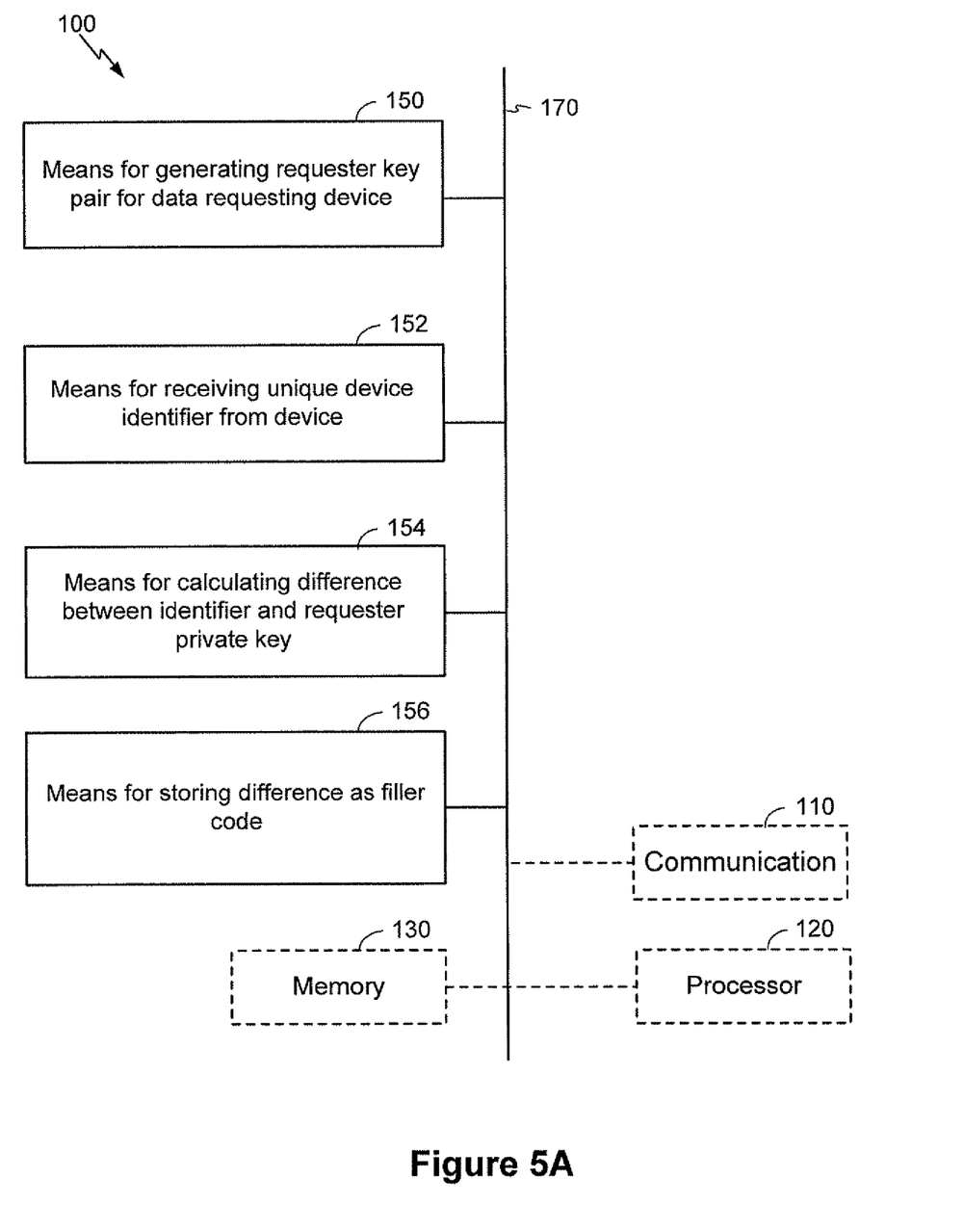
FIGS. 5A-B show one embodiment of an apparatus for sending data via secured communication in PKI.

The memory 130 may include executable code for the at least one processor 120 to: (a) generate a requester key pair for the device, the pair comprising a requester private key and a requester public key; and (b) in response to receiving a unique device identifier from the device, calculate a difference between the identifier and the requester private key.

In related aspects, the at least one processor 120 may store the calculated difference as a filler code in the memory. In further related aspects, the at least one processor may be adapted to: (a) in response to a request for the data from the device, identify the device; (b) encrypt the data using a sender private key and the requester public key; and (c) send the encrypted data and the filler code to the device. In yet further related aspects, the at least one processor 120 may publish a sender public key, such that the device is able to (i) compute the requester private key by adding the filler code to the identifier and (ii) use the computed requester private key to decrypt the encrypted data.

It is noted that device 100 may optionally include: a means 150 for generating a requester key pair for a data requesting device, the pair comprising a requester private key and a requester public key; a means 152 for receiving a unique device identifier from the device; a means 154 for calculating a difference between the identifier and the requester private key; and a means 156 for storing the difference as a filler code.

Figure 5B:
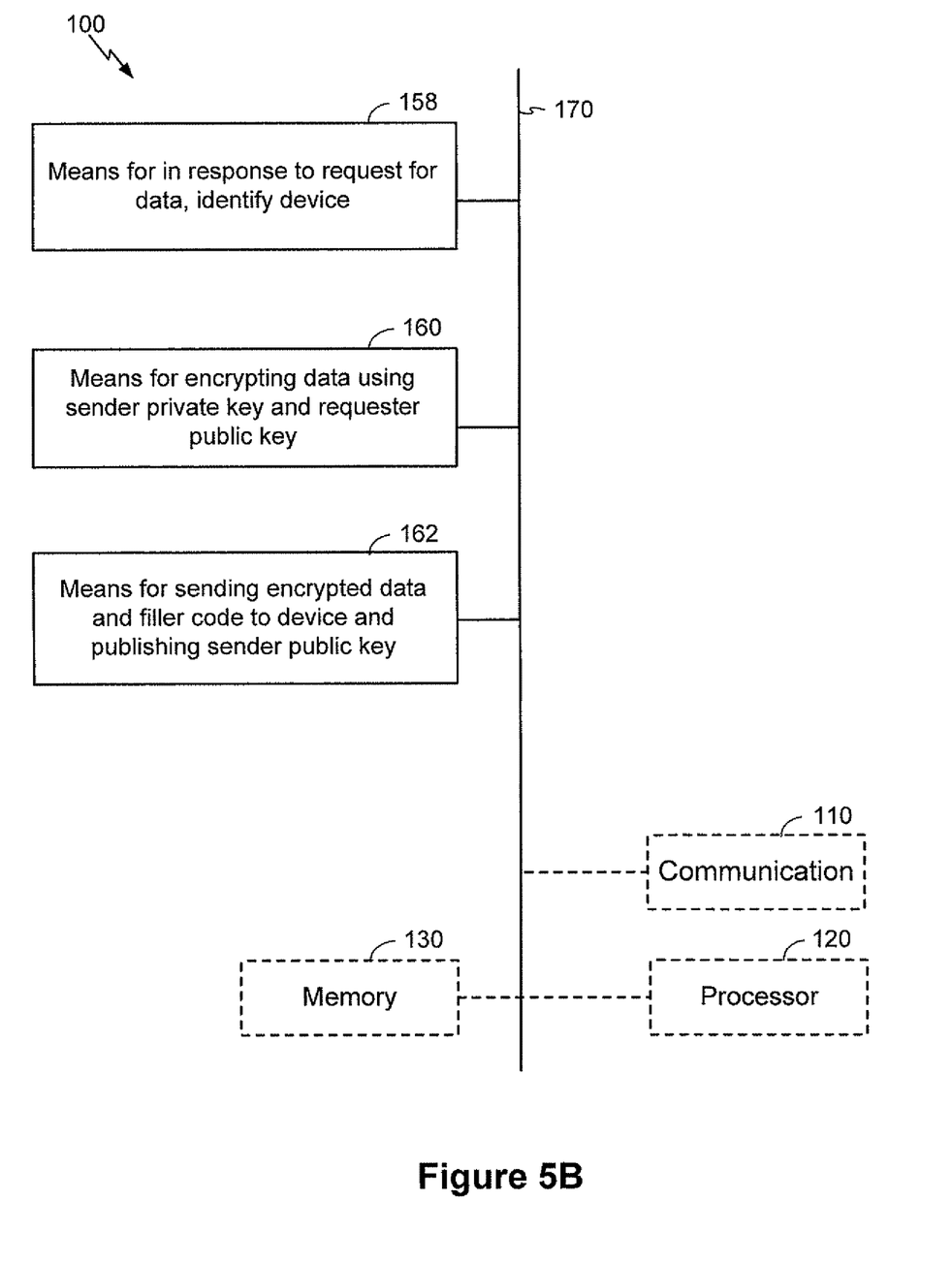

With reference to FIG. 5B, device 100 may optionally include: a means 158 for in response to a request for data from the device, identifying the device; a means 160 for encrypting the data using a sender private key and the requester public key; and a means 162 for sending the encrypted data and the filler code to the device and publishing a sender public key. The at least one processor 120, in such case, may be in operative communication with the means 150-162 via a bus 170 or similar communication coupling. The at least one processor 120 may effect initiation and scheduling of the processes or functions performed by the means 150-162, and any components thereof.

In accordance with one or more aspects of the embodiments described herein, there is provided a device for requesting data via secured communication in a public key infrastructure. With reference to the embodiment of FIG. 6A, there is provided a device 200 may include a communication module 210 for communicating with a data sender; at least one processor 220 in operative communication with the communication module 210; and a memory 230 in operative communication with the at least one processor 220.

Figure 6A:
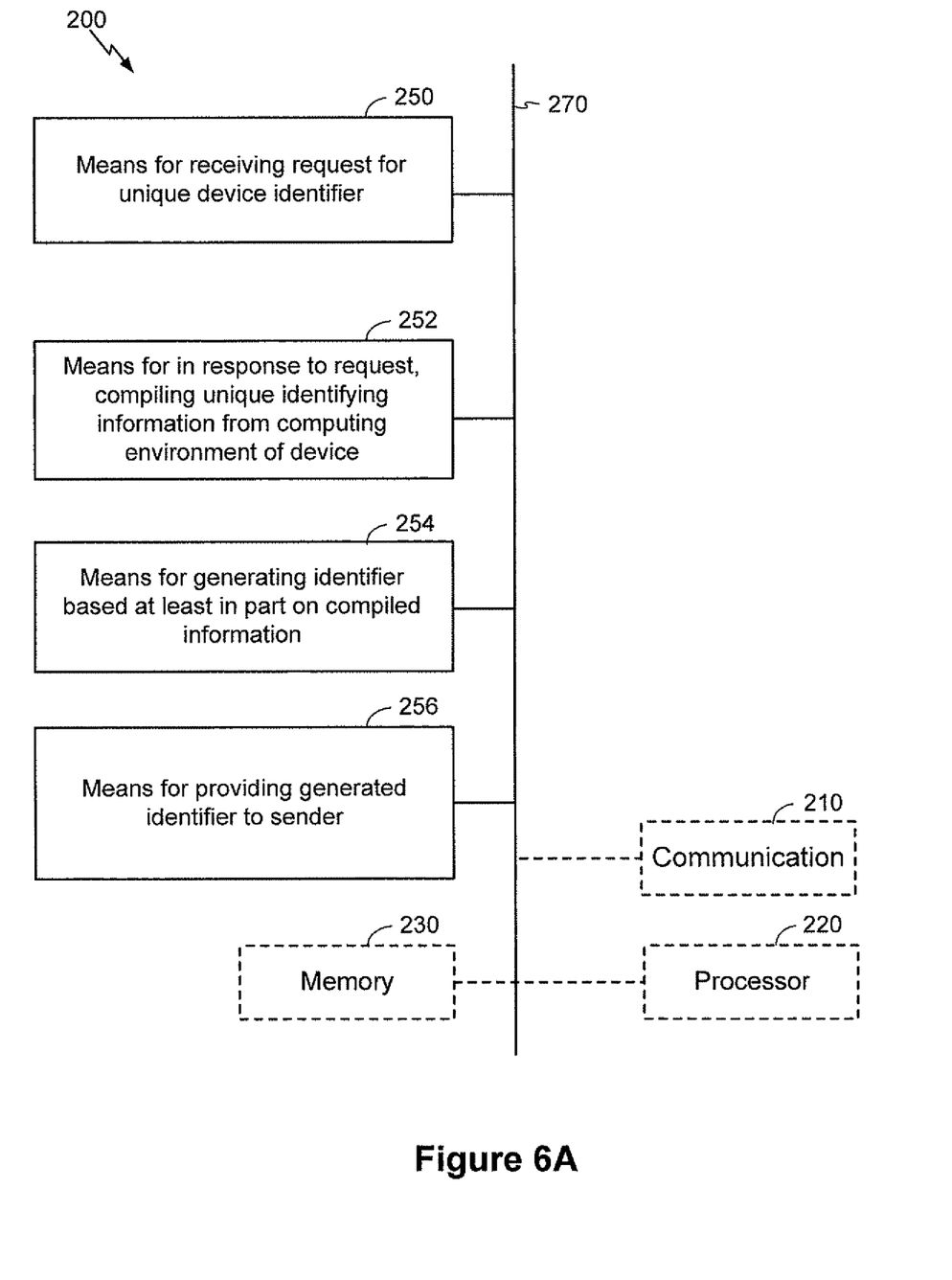
FIG. 6A-B show one embodiment of an apparatus for requesting data via secured communication in a PKI.

The memory 230 may include executable code for the at least one processor 220 to: (a) receive from a data sender a request for a unique device identifier of a requesting device; (b) in response to the request from the sender, compile unique identifying information from a computing environment of the device 200; (c) generate the identifier based at least in part on the compiled information; and (d) instruct the communication module 210 to transmit the generated identifier to the sender.

In related aspects, the at least one processor 220 may be adapted to: (a) in response to receiving encrypted data and a filler code from the sender, compute a requester private key by adding the filler code to the identifier; and (b) use the computed requester private key to decrypt the encrypted data.

In further related aspects, the at least one processor 220 may compile the unique identifying information by compiling at least one user-configurable parameter and at least one non-user-configurable parameter of the device 200. The at least one non-user-configurable parameter may include at least one of hard drive serial number, CPU ID, CPU model, CPU manufacturer, and CPU voltage for the device 200. The at least one non-user-configurable parameter may be based on a carbon degradation characteristic of a computer chip of the device 200. The at least one non-user-configurable parameter may be based on a silicone degradation characteristic of a computer chip of the device 200. The at least one user-configurable may include at least one of hard disk volume name, user name, device name, user password, and hard disk initialization date for the device 200.

It is noted that device 200 may optionally include: a means 250 for receiving from a data sender a request for a unique device identifier of a requesting device; a means 252 for in response to the request from the sender, compiling unique identifying information from a computing environment of the device; a means 254 for generating the identifier based at least in part on the compiled information; and a means 256 for providing the generated identifier to the sender.

Figure 6B:
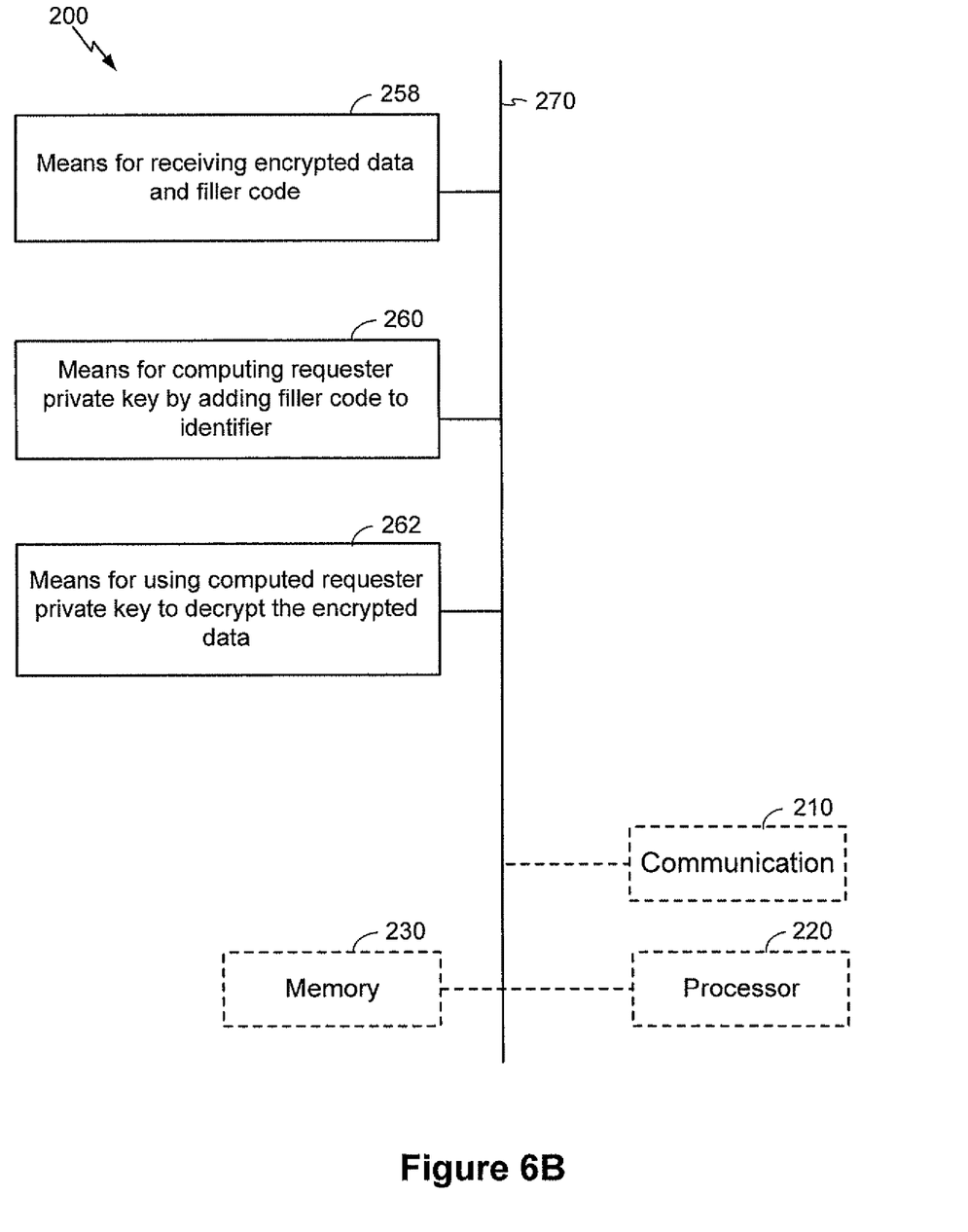

With reference to FIG. 6B, device 200 may optionally include: a means 258 for receiving encrypted data and a filler code from the sender; a means 260 for computing a requester private key by adding the filler code to the identifier; and a means 262 for using the computed requester private key to decrypt the encrypted data. The at least one processor 220, in such case, may be in operative communication with the means 250-262 via a bus 270 or similar communication coupling. The at least one processor 220 may effect initiation and scheduling of the processes or functions performed by the means 250-262, and any components thereof.

Figure 7A:
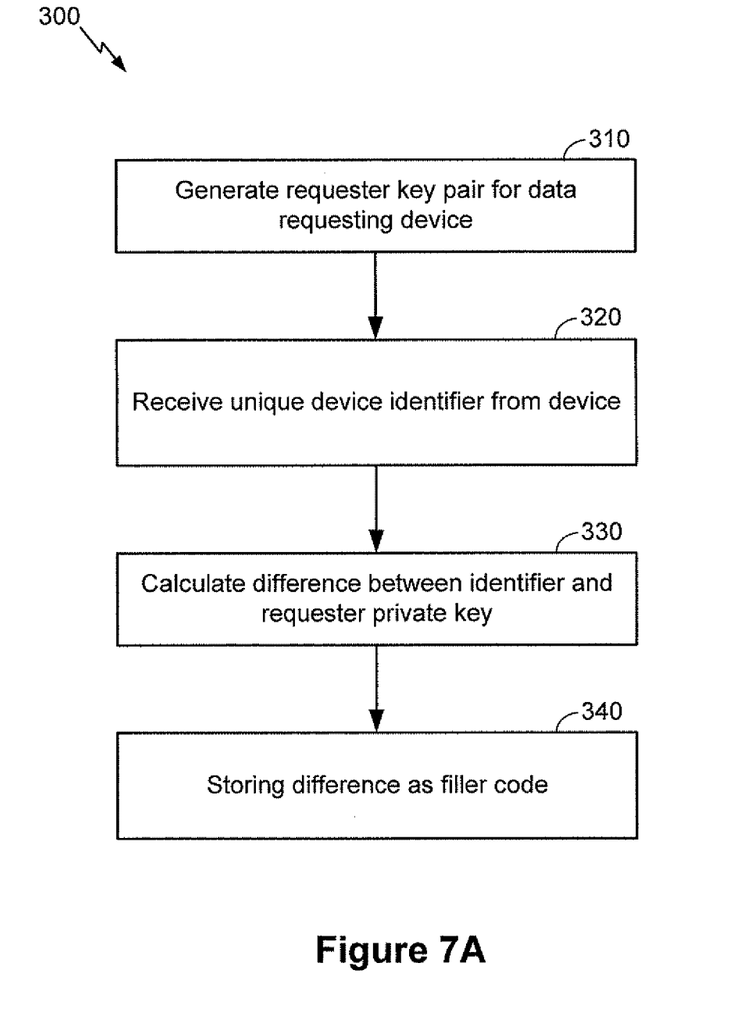
FIGS. 7A-B provide flow diagrams for an exemplary method for sending data via secured communication in a PKI.

In accordance with one or more aspects of the embodiments described herein, there is provided a method for sending data via secured communication in a public key infrastructure. With reference to the embodiment of FIG. 7A, there is shown a flow chart for a method 300 that involves: generating a requester key pair for a data requesting device, the pair comprising a requester private key and a requester public key (step 310); receiving a unique device identifier from the device (step 320); calculating a difference between the identifier and the requester private key (step 330); and storing the difference as a filler code (340).

Figure 7B:
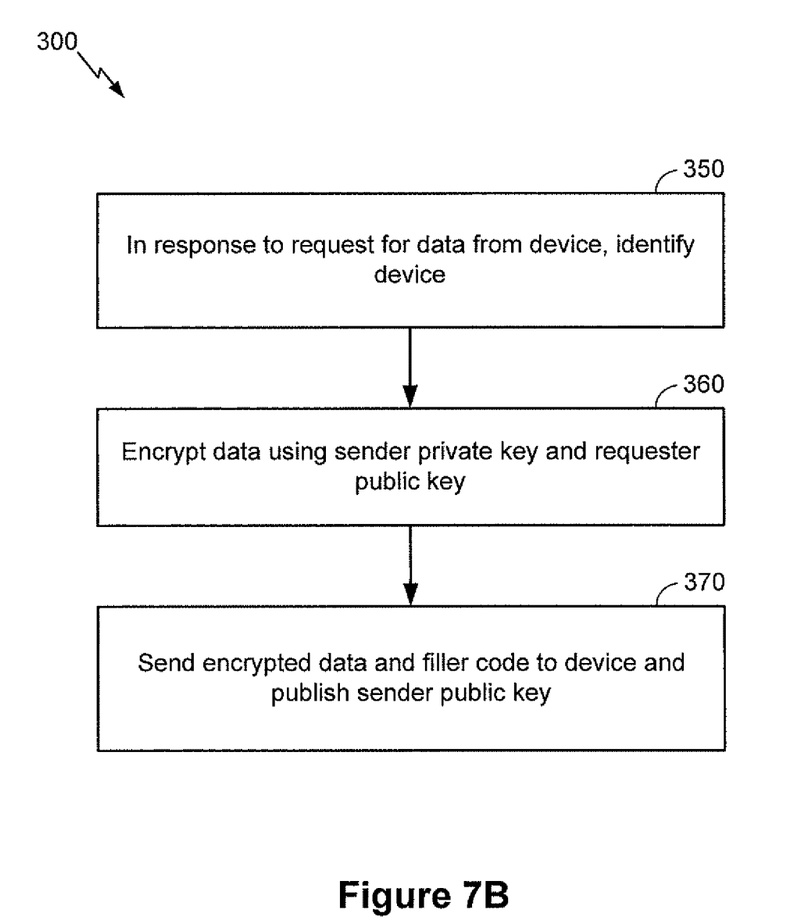

In related aspects, with reference to FIG. 7B, the method 300 may further involve: in response to a request for data from the device, identifying the device (step 350); encrypting the data using a sender private key and the requester public key (step 360); and sending the encrypted data and the filler code to the device (370). In further related aspects, step 370 may further involve publishing a sender public key, such that the device is able to (i) compute the requester private key by adding the filler code to the identifier and (ii) use the computed requester private key to decrypt the encrypted data.

Figure 8A:
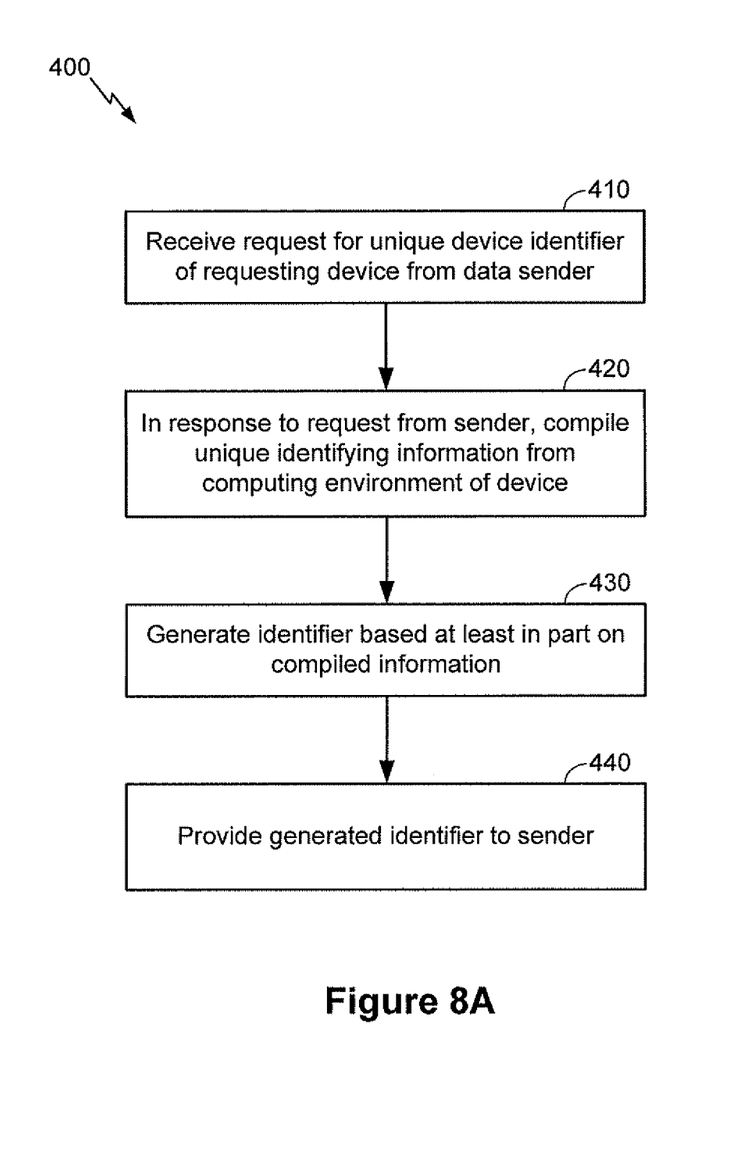
FIGS. 8A-B provide flow diagrams for an exemplary method for requesting data via secured communication in a PKI.

In accordance with one or more aspects of the embodiments described herein, there is provided a method for requesting data via secured communication in a public key infrastructure. With reference to the embodiment of FIG. 8A there is provided a method 400 that involves: receiving from a data sender a request for a unique device identifier of a requesting device (step 410); in response to the request from the sender, compiling unique identifying information from a computing environment of the device (420); generating the identifier based at least in part on the compiled information (430); and providing the generated identifier to the sender (440).

Figure 8B:
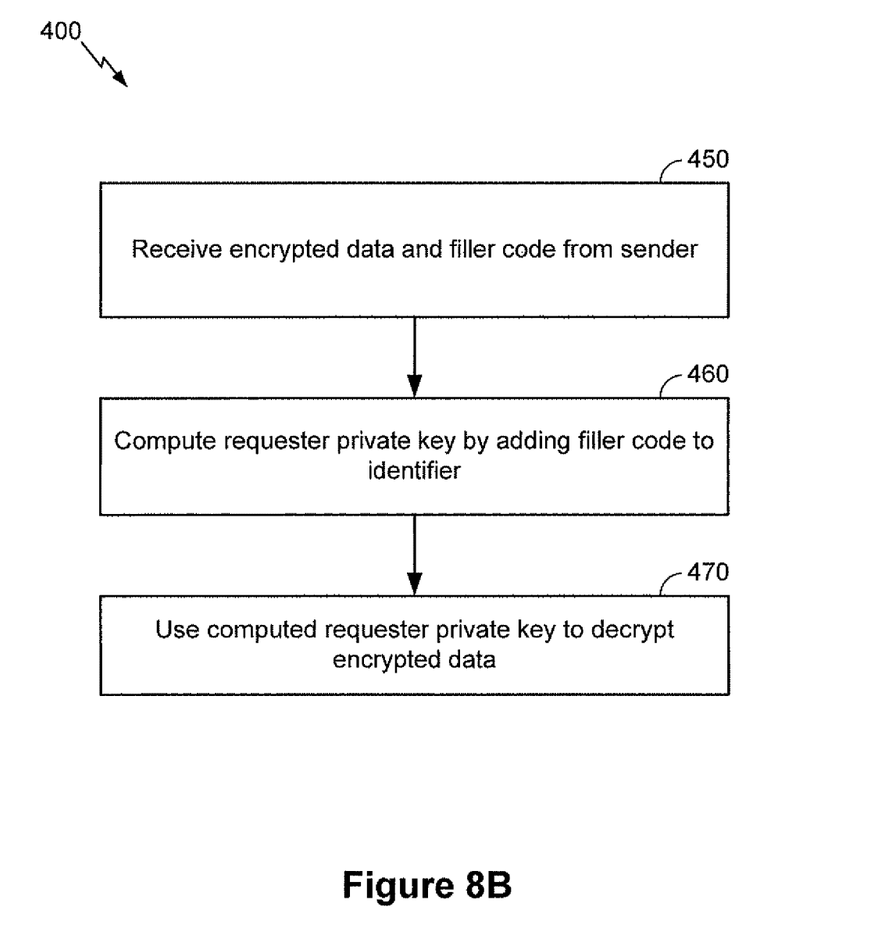

In related aspects, with reference to FIG. 8B, the method 400 may further involve: receiving encrypted data and a filler code from the sender (450); computing a requester private key by adding the filler code to the identifier (460); and using the computed requester private key to decrypt the encrypted data (470). In further related aspects, step 420 may involve compiling at least one user-configurable parameter and at least one non-user-configurable parameter of the device.

While the present invention has been illustrated and described with particularity in terms of preferred embodiments, it should be understood that no limitation of the scope of the invention is intended thereby. Features of any of the foregoing methods and devices may be substituted or added into the others, as will be apparent to those of skill in the art. It should also be understood that variations of the particular embodiments described herein incorporating the principles of the present invention will occur to those of ordinary skill in the art and yet be within the scope of the invention.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

It is understood that the specific order or hierarchy of steps in the processes disclosed herein in an example of exemplary approaches. Based upon design preferences, it is understood that the specific order or hierarchy of steps in the processes may be rearranged while remaining within the scope of the present disclosure. The accompanying method claims present elements of the various steps in sample order, and are not meant to be limited to the specific order or hierarchy presented.

Those skilled in the art will further appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

What is claimed is:

1. A device for sending data via secured communication in a public key infrastructure, comprising:
   a communication module for communicating with a data requesting device;
   at least one processor in operative communication with the communication module; and
   a memory in operative communication with the at least one processor and comprising executable code for the at least one processor to:

generate a requester key pair for the data requesting device, the requester key pair comprising a requester private key and a requester public key; and in response to receiving a unique device identifier from the data requesting device, calculate a difference between the unique device identifier and the requester private key.

2. The device of claim 1, wherein the at least one processor stores the calculated difference as a filler code in the memory.

3. The device of claim 1, wherein the at least one processor is adapted to:

in response to a request for a data from the data requesting device, identify the data requesting device;

encrypt the data using a sender private key and the requester public key; and send the encrypted data and a filler code to the data requesting device.

4. The device of claim 3, wherein the at least one processor publishes a sender public key, such that the data requesting device is able to (i) compute the requester private key by adding the filler code to the unique device identifier and (ii) use the computed requester private key to decrypt the encrypted data.

5. A device for requesting data via secured communication in a public key infrastructure, comprising:

a communication module for communicating with a data sender;

at least one processor in operative communication with the communication module; and a memory in operative communication with the at least one processor and comprising executable code for the at least one processor to:

receive a request for a unique device identifier of a requesting device from the data sender;

in response to the request from the data sender, compile unique identifying information from a computing environment of the requesting device;

generate the unique device identifier based at least in part on the compiled unique identifying information; and instruct the communication module to transmit the generated unique device identifier to the data sender.

6. The device of claim 5, wherein the at least one processor is adapted to:

in response to receiving encrypted data and a filler code from the data sender, compute a requester private key by adding the filler code to the unique device identifier; and use the computed requester private key to decrypt the encrypted data.

7. The device of claim 5, wherein the at least one processor compiles the unique identifying information by compiling at least one user-configurable parameter and at least one non-user-configurable parameter of the device.

8. The device of claim 7, wherein the at least one non-user-configurable parameter comprises at least one of hard drive serial number, CPU ID, CPU model, CPU manufacturer, and CPU voltage for the device.

9. The device of claim 7, wherein the at least one non-user-configurable parameter is based on a carbon degradation characteristic of a computer chip of the device.

10. The device of claim 7, wherein the at least one non-user-configurable parameter is based on a silicone degradation characteristic of a computer chip of the device.

11. The device of claim 7, wherein the at least one user-configurable parameter comprises at least one of hard disk volume name, user name, device name, user password, and hard disk initialization date for the device.

12. A method for secured communication in a public key infrastructure, comprising:

generating a requester key pair for a data requesting device, the requester key pair comprising a requester private key and a requester public key;

receiving a unique device identifier from the data requesting device;

calculating a difference between the unique device identifier and the requester private key; and storing the difference as a filler code.

13. The method of claim 12, further comprising:

in response to a request for data from the data requesting device, identifying the data requesting device;

encrypting the data using a sender private key and the requester public key; and sending the encrypted data and the filler code to the data requesting device.

14. The method of claim 12, further comprising publishing a sender public key, such that the data requesting device is able to (i) compute the requester private key by adding the filler code to the unique device identifier and (ii) use the computed requester private key to decrypt the encrypted data.

15. A method for secured communication in a public key infrastructure, comprising:

receiving from a data sender a request for a unique device identifier of a requesting device;

in response to the request from the data sender, compiling unique identifying information from a computing environment of the requesting device;

generating the unique device identifier based at least in part on the compiled unique identifying information; and providing the generated unique device identifier to the data sender.

16. The method of claim 15, further comprising:

receiving encrypted data and a filler code from the data sender;

computing a requester private key by adding the filler code to the unique device identifier; and using the computed requester private key to decrypt the encrypted data.

17. The method of claim 15, wherein compiling the unique identifying information comprises compiling at least one user-configurable parameter and at least one non-user-configurable parameter of the device.

18. The method of claim 17, wherein compiling the at least one non-user-configurable parameter comprises compiling at least one of hard drive serial number, CPU ID, CPU model, CPU manufacturer, and CPU voltage for the device.

19. The method of claim 17, wherein compiling the at least one non-user-configurable parameter comprises compiling a carbon degradation characteristic of a computer chip of the device.

20. The method of claim 17, wherein compiling the at least one non-user-configurable parameter comprises compiling a silicone degradation characteristic of a computer chip of the device.

21. The method of claim 17, wherein compiling the at least one user-configurable parameter comprises compiling at least one of hard disk volume name, user name, device name, user password, and hard disk initialization date for the device.

* * * * *